June 22, 1948.  H. V. ATWELL  2,443,673
METHOD OF EFFECTING CATALYTIC CONVERSIONS
Filed May 3, 1944  2 Sheets-Sheet 1
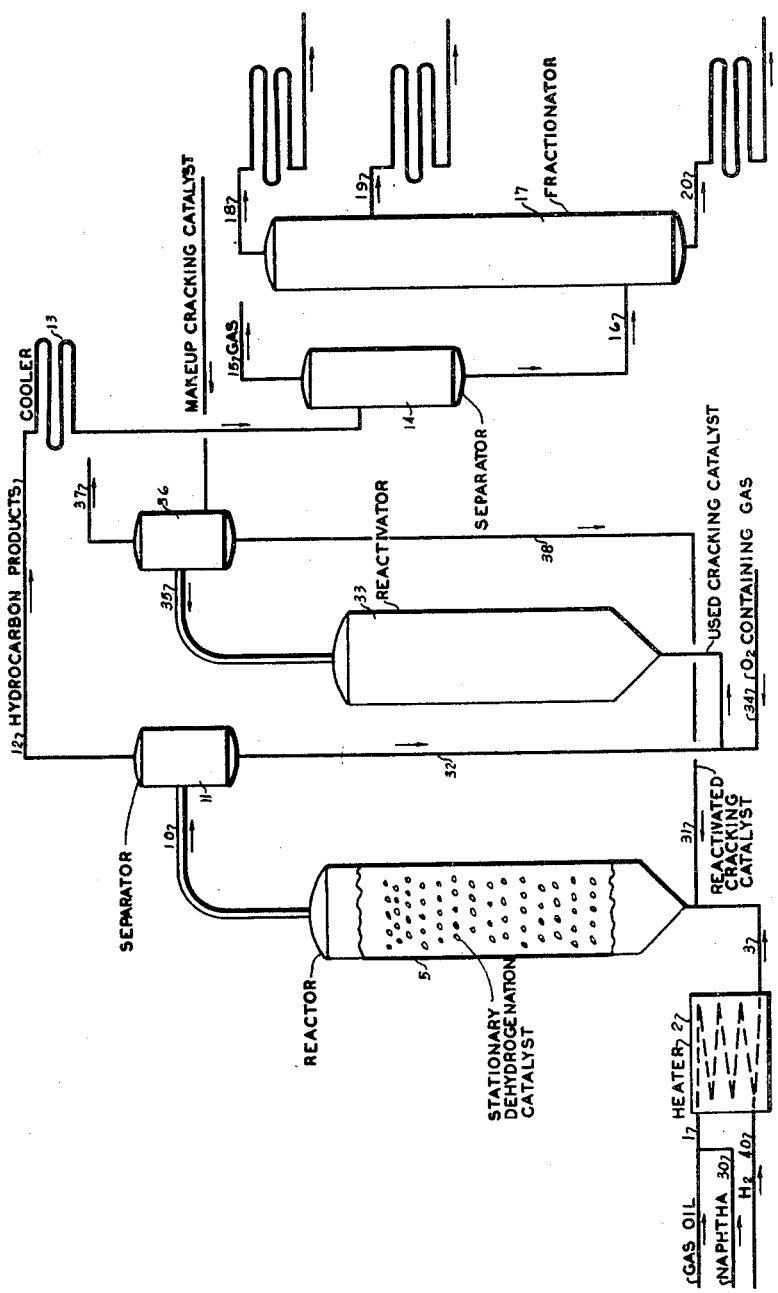
FIG. N° 1
HAROLD V. ATWELL
INVENTOR
BY 
HIS ATTORNEY June 22, 1948. H. V. ATWELL 2,443,673
METHOD OF EFFECTING CATALYTIC CONVERSIONS
Filed May 3, 1944 2 Sheets-Sheet 2
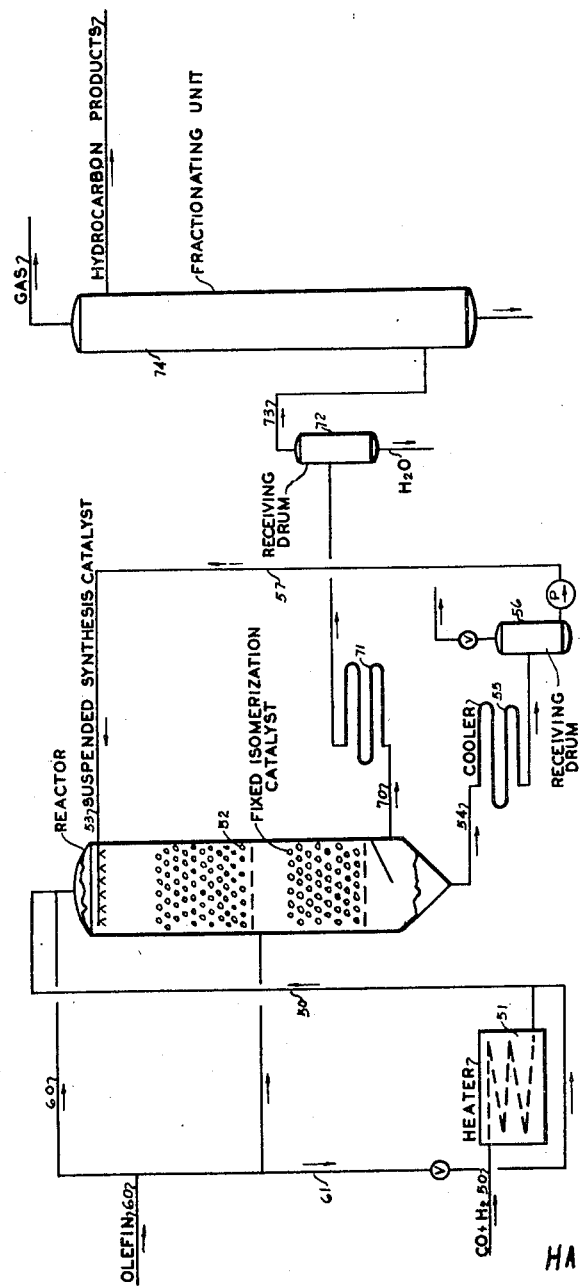
FIG. Nº 2
HAROLD V. ATWELL
INVENTOR
BY
HIS ATTORNEY Patented June 22, 1948

2,443,673

UNITED STATES PATENT OFFICE 2,443,673

METHOD OF EFFECTING CATALYTIC CONVERSIONS

Harold V. Atwell, Beacon, N. Y., assignor to The Texas Company, New York, N. Y., a corporation of Delaware Application May 3, 1944, Serial No. 533,901

12 Claims. (Cl. 196—52)

This invention relates to a method of effecting catalytic conversions and particularly a method for effecting two or more reactions substantially simultaneously in a common reaction zone.

The invention has application to the conversion of hydrocarbons, and to conversion reactions which involve the production of gasoline and other desired hydrocarbon products. The invention may involve simultaneous treatment of different feed hydrocarbons with separate catalysts, the composite product comprising hydrocarbons useful in the manufacture of motor fuel.

In accordance with the invention, the separate catalyst reactions are carried out in the presence of each other or in close proximity to each other within a common reaction zone. Each of the reactions or conversions may be of exothermic character or they may be of endothermic character, although it is advantageous to employ a combination of exothermic and endothermic conversions so that heat liberated in the one conversion may be utilized to provide heat for the companion conversion. In the event that the companion reaction is not endothermic, or is endothermic only to a small extent, the exothermic reaction may be used for heating the reactants for the companion conversion.

In reactions which are highly exothermic and wherein it is important to maintain the reaction temperature within predetermined and narrow temperature ranges, it is necessary to remove heat rapidly and effectively from the reaction zone so as to maintain the desired temperature conditions. Accordingly, the present invention contemplates accomplishing this, at least in part, by effecting a separate reaction of endothermic character with a different reactant and a different catalyst in the same reaction zone.

Reactions which are exothermic in character comprise isomerization of aliphatic hydrocarbons, polymerization or hydrogenation of olefinic hydrocarbons, and reaction of carbon monoxide and hydrogen to produce normally liquid hydrocarbons and oxygenated hydrocarbon compounds. Reactions which are endothermic in character comprise dehydrogenation of saturated hydrocarbons and cracking of hydrocarbons, such as gas oil, to produce gasoline.

Irrespective of whether or not the companion conversions are respectively exothermic and endothermic, a novel feature of the invention resides in carrying out simultaneously in a common reaction zone two or more separate conversions which are capable of producing a composite hydrocarbon product, certain constituents of which are formed from one conversion and certain of which are formed from the companion conversion.

In accordance with the invention two different stocks may be treated simultaneously, or two different reactions may be catalyzed on a single feed stock. Primary conversion of the feed stock may be effected and in addition a further reaction of the product or products of the primary conversion in the same reaction zone.

For example, gas oil may be catalytically cracked, and naphthenes produced in the cracking reaction may be dehydrogenated with a separate catalyst. Also, the naphthenes may be charged from an extraneous source, in which case a straight run naphtha may be charged to the cracking reaction zone.

The naphthene hydrocarbons present are converted into aromatics with the liberation of hydrogen as a result of the action of the dehydrogenating catalyst. The hydrogen so liberated is consumed at least in part to saturate olefins which are formed in the cracking of the gas oil or which may be present in the feed to the process. Thus, there is obtained a composite product, the naphtha fraction of which will contain saturated aliphatic hydrocarbons and aromatic hydrocarbons in large amounts, and therefore, quite useful in the manufacture of high octane motor fuel having high lead susceptibility.

Another pair of conversions which may be carried out simultaneously comprise the reaction of carbon monoxide and hydrogen to produce liquid hydrocarbons and the isomerization of unsaturated aliphatic hydrocarbons, particularly unsaturated hydrocarbons formed in the synthesis reaction.

A still further example comprises the polymerization of propylene to nonylenes with a silica-alumina catalyst at about 800° F., and the simultaneous cyclization and dehydrogenation of nonylenes largely to mesitylene with a molybdena-alumina catalyst.

The employment of two separate catalysts in a common reaction zone may be accomplished by confining a mass of one catalyst within the reaction zone while passing a suspension of the other catalyst in a suitable fluid, either gaseous or liquid, through the confined mass of catalyst, the suspended catalyst being removed with the reaction products, separated therefrom and recycled to the reaction zone. This type of operation is advantageous wherein it is desired to use the moving catalyst suspension as an additional means of removing heat from the reaction zone.

In such case the catalyst stream is cooled prior to return to the reaction zone.

Fig. 1 of the accompanying drawing illustrates a method of flow useful in effecting gas oil cracking and naphtha dehydrogenation in a common reaction zone.

As indicated in Fig. 1, a gas oil feed is drawn from a source not shown through a pipe 1 and passed through a heater 2 wherein it is heated to a temperature in the range 800 to 1000° F.

The heated oil is discharged from the heater through a pipe 3 through which it is conducted to the lower portion of a vertical reaction vessel 5.

The vessel 5 contains a fixed bed of dehydrogenating catalyst which is in the form of granules, pellets, rings, or cylinders. If the catalyst is in the form of granules or particles, such granules or particles should be relatively coarse, for example, ranging in diameter from ¼ to ½ inch, so as to facilitate passage of gaseous fluids laden with powdered cracking catalyst through the fixed beds.

A suitable dehydrogenating catalyst comprises a composite of nickel sulfide and tungsten sulfide. A catalyst comprising $Mo_2O_3$ supported on finely divided alumina might also be used for this purpose.

A suitable cracking catalyst is one of the silica alumina type. An effective cracking catalyst is a composite free of alkali metal compounds and comprising a calcined mixture of precipitated hydro gels of silica alumina and zirconia. The cracking catalyst in the form of particles predominantly in the range 100 to 200 mesh is suspended in the oil vapor flowing through the fixed bed.

The heated gas oil in vapor phase at a temperature in the range 800 to 1000° F. rises through the fixed catalyst bed and undergoes cracking to produce gasoline hydrocarbons due to the action of the finely divided cracking catalyst suspended therein. At the same time naphthene hydrocarbons produced in the cracking reaction are dehydrogenated. The cracked hydrocarbon products are removed from the top of the reactor through a conduit 10 leading to a separator 11, to which reference will be made later. From the top of the separator 11 the hydrocarbons, including cracked and unreacted hydrocarbons, are conducted through a pipe 12 and condenser 13 to a gas separator 14. Gaseous constituents are discharged from the separator 14 through a pipe 15. The hydrocarbons are drawn off from the bottom of the separator through a pipe 16 leading to a fractionator 17 wherein they are fractionated into as many fractions of desired boiling range as may be desired. A light distillate fraction, for example, is removed through a pipe 18 while an intermediate fraction is removed through pipe 19, and a residual fraction is removed through a pipe 20.

The naphtha hydrocarbons from an outside source which it is desired to dehydrogenate may comprise straight run gasoline or naphtha or any fraction thereof. Straight run gasoline usually contains naphthene hydrocarbons which it may be desired to dehydrogenate for the production of aromatic hydrocarbons.

At any rate, the straight run naphtha hydrocarbons are drawn from a source not shown through a pipe 30 and passed into the inlet of the heater 2, wherein it may commingle with the previously mentioned gas oil feed, so that the heated naphtha and gas oil vapors pass through the reactor 5 simultaneously.

The naphtha feed may be separately heated prior to introduction to the reactor 5.

The powdered cracking catalyst is conducted through a conduit 31 from a source which will be referred to later and injected into the stream of hydrocarbon vapors flowing through the pipe 3 into the reactor 5. The volume and velocity of vapor flow through the reactor 5 is sufficient to maintain the powdered catalyst suspended in the vapors as they rise through the fixed catalyst bed.

Accordingly, the reaction products flowing through the previously mentioned conduit 10 comprise products of the cracking reaction as well as products of the dehydrogenating reaction, and in addition, catalyst powder suspended therein. These products are discharged into the separator for the purpose of effecting separation of the suspended catalyst from the hydrocarbons. The separator 11 may be of either centrifugal or electrical type or may comprise a combination of both.

The separated catalyst is continuously drawn off through a conduit 32 leading to the bottom of a reactivator 33 wherein carbonaceous material deposited on the catalyst is removed therefrom by burning with an oxygen containing gas. The reactivating gas is introduced from a source not shown through a pipe 34 and is used so as to force the catalyst powder upwardly through the reactivator 33. The products of combustion and the reactivated catalyst are discharged through a conduit 35 into a dust separating unit 36. The gaseous products of combustion are discharged from the separator 36 through a pipe 37.

The reactivated catalyst together with any make-up catalyst which may be added at this point is drawn off through a conduit 38, which communicates with the previously mentioned conduit 31, by which means the reactivated catalyst is recycled through the reaction zone.

As indicated, the conversion reactions may be carried out in the presence of added hydrogen drawn from a source not shown and introduced to a section of the heater 2 through a pipe 40. The conversion reactions may be carried out with little or on consumption of hydrogen. Furthermore, the dehydrogenation of naphtha hydrocarbons liberates substantial amounts of hydrogen, some of which may be used to saturate olefin hydrocarbons present in the conversion reaction zone. The remainder of the hydrogen will be removed with the reaction products.

Consequently, provision may be made for removing this residual hydrogen from the products in the separator 11 and recycling it through the reaction zone.

Fig. 2 illustrates a method of flow for carrying out simultaneously the reaction of carbon monoxide and hydrogen to produce synthetic hydrocarbons and the isomerization of olefin hydrocarbons.

Carbon monoxide and hydrogen in the proportion of about 1 mol of carbon monoxide to 2 mols of hydrogen are drawn from a source not shown through a pipe 50 and passed through a heater 51 wherein the gases are heated to a temperature of about 360 to 380° F.

The heated gases are then passed to a reactor 52. This reactor contains one or more beds of solid catalyst effective for the isomerization of unsaturated aliphatic hydrocarbons. The catalyst is in the form of relatively course granules, particles, pellets, or rings.

The synthesis catalyst is suspended in a suitable liquid such as a higher boiling fraction of the hydrocarbon products produced in the process. A suitable liquid may boil in the range about 500 to 600° F. The synthesis catalyst comprises either cobalt, iron, or nickel together with a promoter, such as the oxides of thorium, magnesium, uranium, and vanadium on a supporting material such as diatomaceous earth, silica gel, or Filtrol.

The slurry of the catalyst suspended in liquid is introduced to the top of the reactor 52 from a pipe 53 and sprayed above the catalyst beds. All of the suspension may be introduced into the upper part of the vessel 52 or provision may be made for introducing part of it at successive points, as for example, between succeeding catalyst beds.

The catalyst slurry trickles down over the solid catalyst, and consequently flows through the catalyst beds concurrently with the reactant gases, carbon monoxide, and hydrogen.

The catalyst slurry accumulates in the bottom of the reactor and is continuously removed therefrom through a pipe 54 and a cooler 55 to a receiving drum 56.

From the drum 56 the catalyst slurry is conducted through a pipe 57 communicating with the previously mentioned pipe 53 for return to the reaction zone.

The olefin feed which may comprise normal olefins having from about 5 to 9 carbon atoms per molecule is conducted from a source not shown through a pipe 60. A portion of the olefins may be bypassed through pipe 61 to the heating coil 51. On the other hand, all or a portion of the feed olefins may be passed directly to the reactor 52. Provision may be made for introducing the olefins to the reactor at two or more succeeding points as indicated.

The olefins and synthesis gas flow concurrently through the beds of fixed catalyst. As previously mentioned, this fixed catalyst is one effective for isomerization and may comprise, for example, precipitated hydrated silica and a hydrated oxide selected from the group consisting of precipitated alumina and precipitated zirconia, the catalyst being substantially free of alkali metal ions.

Such catalyst is capable of effecting isomerization of straight chain olefins at temperatures as low as about 400° F.

Other catalysts may be used, such as phosphoric acid or kieselguhr.

The hydrocarbon products of reaction are drawn off in vapor phase from the lower portion of the vessel 52 through pipe 70 and cooler 71 to a receiving drum 72.

Provision may be made for settling water from the products in the drum 72.

From the drum 72 the hydrocarbons, including gases, are conducted through pipe 73 to a fractionating unit 74, wherein provision may be made for separating the unreacted gases, such as, carbon monoxide and hydrogen, for return to the reaction.

The fractionator 74 may be operated in any suitable manner so as to obtain the particular fractions desired, such fractions comprising a composite of hydrocarbons formed in the synthetic and isomerization reactions.

Reference has been made to employing downflow of vapors in the reactor 52. However, it will be understood that upflow of reactants may be employed.

Upflow of the catalyst suspended in a liquid medium may be employed, in which case the fixed catalyst will be flooded with the liquid and the gaseous reactants will also flow upward. Instead of suspending the catalyst in a liquid medium, it may be suspended in the stream of vapors passing through the confined catalyst mass employing either downflow or upflow. In such case provision will be made for separating the suspended catalyst powder from the effluent stream of products.

Also, in connection with Fig. 1 it will be understood that downflow of reactants may be employed.

In both figures the catalysts may be reversed. Thus, in Fig. 1 the cracking catalyst may be confined within the reactor 5 while the dehydrogenating catalyst is circulated.

Instead of maintaining the confined catalyst in the form of a fixed bed, it may be maintained in a "fluid" form. In other words, the confined catalyst can be in the form of a mass of relatively coarse particles through which the rising reactants and relatively fine catalysts rise at sufficient velocity to maintain the coarse catalyst in a highly agitated condition, the linear flow being insufficient to carry the coarse catalyst particles out of the reactor.

While certain specific catalysts have been mentioned, it will be understood that these are mentioned merely by way of example and that other known catalysts for cracking, dehydrogenation, isomerization, etc. may be employed.

In the combination process of Fig. 1 the oil undergoing dehydrogenation may be any oil rich in hydro-aromatics, as for example, kerosene derived from naphthene base crude.

The confined catalyst can be subjected to periodic reactivation, and therefore, it is advantageous to employ a plurality of reactors so that the charge can be switched from one to the other when it is desired to effect reactivation of the confined or fixed bed catalyst.

The onstream period for the cracking catalyst tends to be substantially increased by effecting simultaneously with cracking of fed oil, the dehydrogenation of hydro-aromatics, as illustrated in Fig. 1. Free hydrogen present in the reactor enters into reaction with carbonaceous material that tends to accumulate on the catalyst with the formation of additional hydrocarbons.

The term "non-transitory" as used herein and in the present claims in reference to the relatively coarse granular catalyst bed means catalyst granules essentially confined and retained in the reaction zone during passage of the reactant gases and entrained catalyst powder upwardly therethrough. In particular it contemplates operation with a coarse catalyst bed of such particle character correlated with an upward fluid flow rate that there is no material entrainment of the granules in the effluent product stream and thus no material withdrawal of granules by this means from the reaction zone.

Obviously many modifications and variations of the invention as above set forth may be made without departing from the spirit and scope thereof, and therefore only such limitations should be imposed as are indicated in the appended claims.

I claim:

1. A process for effecting simultaneous catalytic conversion of chemically different reactants, said conversion involving at least two different reactions each catalyzed with a separate and chemically different solid catalyst in a common reaction zone, one of said catalysts being effective for converting one of said reactants while the other of said catalysts is effective for converting the other of said reactants, which comprises continuously confining a substantially non-transitory mass of one of said catalysts in relatively coarse particle form within the reaction zone, suspending said other catalyst in powdered form in a stream of mixed reactant fluids, passing said stream of reactant fluid and suspended catalyst through said reaction zone in direct contact with said confined catalyst mass, and maintaining the reaction zone under reaction conditions such that both said reactions are effected to a substantial extent.

2. A process for effecting simultaneous catalytic conversion of reactants, said conversion involving at least two different reactions each with a separate and chemically different solid catalyst in a common reaction zone, one of said reactions being endothermic while the other is exothermic, which comprises continuously confining a substantially non-transitory mass of one of said catalysts in relatively coarse particle form within the reaction zone, suspending the other catalyst in powdered solid form in a fluid medium, continuously passing said suspension through the reaction zone in direct contact with the confined catalyst mass, continuously passing a stream of mixed reactants through the reaction zone in direct contact with both said confined catalysts, and effecting said conversion reactions to a substantial extent while in heat exchange relationship within the reaction zone.

3. A process for effecting simultaneous catalytic conversion of reactants, said conversion involving at least two different reactions each catalyzed with a separate and chemically different solid catalyst in a common reaction zone, which comprises maintaining one of said catalysts in the form of a substantially stationary porous mass within the reaction zone, continuously passing through said mass a vaporous stream of reactant fluid, suspending in the fluid stream said other catalyst in solid powdered form such that the suspended catalyst moves through the stationary catalyst mass, and maintaining said reaction zone under conversion conditions such that both said conversions are effected to a substantial extent.

4. A process for the manufacture of naphtha hydrocarbon which comprises maintaining a reaction zone having confined therein a mass of solid dehydrogenating catalyst maintained at a temperature effective for catalytic cracking of hydrocarbons, passing to the reaction zone a stream of gas oil vapor heated to cracking temperature, simultaneously passing to the reaction zone a stream of vaporized oil rich in hydro-aromatics, injecting in said stream a cracking catalyst in finely divided form, passing the combined hydrocarbon vapors and suspended catalyst therein through the confined mass of dehydrogenating catalyst within the reaction zone, effecting cracking of hydrocarbons and dehydrogenation of hydro-aromatics during said passage, continuously removing products of both said conversions including suspended catalyst, separating the catalyst from the removed products, and recycling the separated catalyst to the reaction zone.

5. A process for the manufacture of valuable hydrocarbons which comprises maintaining a reaction zone having confined therein a mass of solid catalyst effective for isomerization of unsaturated aliphatic hydrocarbons, passing to the reaction zone a stream of heated vaporized olefins, simultaneously passing to the reaction zone a stream of carbon monoxide and hydrogen, passing both said vapor streams through the confined catalyst mass maintained at a temperature sufficiently elevated to effect reaction between carbon monoxide and hydrogen in the presence of a hydrogenating catalyst, continuously passing through the confined catalyst mass during passage of the combined vapors therethrough a suspension of hydrogenation catalyst in a carrier fluid, effecting simultaneous isomerization of olefins and conversion of carbon monoxide and hydrogen to normally liquid hydrocarbons, continuously removing products of both said conversions and suspended catalyst from the reaction zone, and recycling the removed catalyst through the reaction zone.

6. A continuous method of effecting substantially simultaneously the catalytic conversion of one feed material by a specific conversion reaction and another feed material of different chemical constitution by a different conversion reaction which comprises confining within a reaction zone a mass of solid catalyst effective for catalyizng said first-mentioned reaction, suspending in a fluid medium a powdered solid catalyst of different chemical composition effective for catalyzing said second-mentioned reaction, passing a stream of said fluid containing suspended catalyst continuously through the reaction zone in contact with said confined catalyst, continuously passing both said feed materials in a continuous stream through the reaction zone in contact with said catalyst, and effecting both said conversion reactions to a substantial extent in the presence of each other.

7. A continuous method of effecting substantially simultaneously the catalytic conversion of one hydrocarbon feed by a specific conversion reaction and another hydrocarbon feed of different chemical constitution by a different conversion reaction which comprises passing both said feed hydrocarbons in a continuous stream through a reaction zone, confining within the reaction zone a mass of solid catalyst effective for catalyzing said first-mentioned reaction, suspending powdered solid catalyst of different chemical composition effective for catalyzing said second-mentioned reaction in feed hydrocarbons passing to the reaction zone, said hydrocarbons containing suspended catalyst passing through the reaction zone in contact with said confined catalyst, effecting both said conversion reactions to a substantial extent in the presence of each other such that a composite hydrocarbon product is obtained containing hydrocarbons from both said conversions, and continuously removing from the reaction zone a stream of said composite.

8. A process for the manufacture of naphtha hydrocarbon which comprises maintaining a reaction zone having confined therein a mass of solid dehydrogenating catalyst maintained at a temperature effective for catalytic cracking of hydrocarbons, passing to the reaction zone a stream of gas oil vapor heated to cracking temperature, simultaneously passing to the reaction zone a stream of vaporized oil rich in hydro-aromatics, injecting in said vapor stream a cracking catalyst in finely divided form, passing the combined hydrocarbon vapors and suspended catalyst therein through the confined mass of dehydrogenating catalyst within the reaction zone, effecting cracking of hydrocarbons and dehydrogenation of hydro-aromatics during said passage, and continuously removing products of both said conversions including suspended catalyst from the reaction zone.

9. A process for effecting simultaneous catalytic conversion of two hydrocarbon feed stocks of different composition, said conversion involving at least two different reactions each catalyzed with a separate and chemically different solid catalyst in a common reaction zone, one of said catalysts being effective for converting one of said hydrocarbon feed stocks while the other of said catalysts is effective for converting the other of said hydrocarbon feed stocks, which comprises maintaining one of said catalysts as a catalyst mass confined within the reaction zone, suspending said other catalyst in powdered form in a stream of mixed hydrocarbon feed, passing said hydrocarbon stream and suspended catalyst through said reaction zone in direct contact with said confined catalyst, maintaining the reaction zone under reaction conditions such that both said reactions are effected to a substantial extent, and continuously removing converted hydrocarbons from the reaction zone.

10. A continuous process for effecting catalytic conversion of gaseous reactants by contact with a powdered catalyst within a reactin zone maintained under predetermined conversion conditions which comprises disposing within a vertical reaction zone a substantially non-transitory mass of solid contact material in relatively coarse particle form, continuously introducing to the lower portion of said zone a gaseous reactant stream containing reactants which are not acted upon by said coarse contact material under the conditions prevailing within the reaction zone, suspending in the reactant stream catalyst powder in relatively fine powdered form, passing said stream containing suspended catalyst powder upward through said mass of particles with sufficient velocity to maintain said coarse particles in a highly agitated condition but without substantial entrainment of said coarse particles from the reaction zone, effecting substantial conversion of said reactants with said powdered catalyst during passage through the contact mass, continuously removing from the upper portion of said reaction zone an effluent stream of reaction products containing the catalyst powder suspended in the aforesaid gaseous reactant stream.

11. A continuous process for effecting catalytic conversion of gaseous reactants by contact with a powdered catalyst within a reaction zone maintained under predetermined conversion conditions which comprises disposing within a vertical reaction zone a substantially non-transitory mass of solid contact material in relatively coarse particle form, continuously introducing to the lower portion of said zone a gaseous reactant stream containing reactants which are not acted upon by said coarse contact material under the conditions prevailing within the reaction zone, suspending in the reactant stream catalyst powder in relatively fine powdered form, passing said stream containing suspended catalyst powder upward through said mass of particles with sufficient velocity to maintain said coarse particles in a highly agitated condition but without substantial entrainment of said coarse particles from the reaction zone, effecting substantial conversion of said reactants with said powdered catalyst during passage through the contact mass, continuously removing from the upper portion of said reaction zone an effluent stream of reaction products containing the catalyst powder suspended in the aforesaid reactant stream, discharging reaction products, and recycling effluent catalyst powder to the lower portion of said reaction zone for suspending in gaseous reactants rising through the reaction zone at substantially the same rate at which it is removed from the upper portion of the reaction zone.

12. A continuous process for effecting catalytic conversion of gaseous reactants including carbon monoxide and hydrogen by contact with a powdered synthesis catalyst within a reaction zone maintained under predetermined conversion conditions which comprises disposing within a vertical reaction zone a substantially non-transitory mass of solid contact material in relatively coarse particle form, said contact material being catalytically inert with respect to the conversion of carbon monoxide and hydrogen into higher molecular weight compounds, continuously introducing to the lower portion of said zone a gaseous reactant stream containing carbon monoxide and hydrogen, suspending in the gaseous stream powdered synthesis catalyst in relatively fine particle form, passing said stream containing suspended catalyst powder upward through said mass of coarse particles with sufficient velocity to maintain said coarse particles in a highly agitated condition but without substantial entrainment of said coarse particles from the reaction zone, effecting substantial conversion of carbon monoxide and hydrogen into compounds of higher molecular weight with said synthesis catalyst during passage through the contact mass, and continuously removing from the upper portion of said reaction zone an effluent stream of reaction products containing the catalyst powder suspended in the aforesaid gaseous reactant stream.

HAROLD V. ATWELL.

REFERENCES CITED

The following references are of record in the file of this patent:

UNITED STATES PATENTS

| Number | Name | Date |
|---|---|---|
| 1,221,698 | Day | Apr. 3, 1917 |
| 2,206,729 | Pier | July 2, 1940 |
| 2,239,801 | Voorhees | Apr. 29, 1941 |
| 2,284,468 | Burk et al. | May 26, 1942 |
| 2,377,512 | Page, Jr. | June 15, 1945 |
| 2,409,476 | Creelman et al. | Oct. 15, 1946 |

FOREIGN PATENTS

| Number | Country | Date |
|---|---|---|
| 23,045 | Great Britain | Aug. 24, 1911 |